United States Patent
Mazumder et al.

(10) Patent No.: US 12,506,712 B2
(45) Date of Patent: Dec. 23, 2025

(54) SYSTEMS AND METHODS FOR IMPLEMENTING REAL TIME PROTOCOL MODIFICATIONS FOR ADDRESS RESOLUTION PROTOCOLS IN A NETWORK ENVIRONMENT

(71) Applicant: BANK OF AMERICA CORPORATION, Charlotte, NC (US)

(72) Inventors: Shahadat Hossain Mazumder, Charlotte, NC (US); Maneesh Sethia, Telangana (IN); Abhijit Behera, Telangana (IN); Khushi Agrawal, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 44 days.

(21) Appl. No.: 18/663,508

(22) Filed: May 14, 2024

(65) Prior Publication Data

US 2025/0358262 A1    Nov. 20, 2025

(51) Int. Cl.
*H04L 9/40* (2022.01)

(52) U.S. Cl.
CPC ........ *H04L 63/029* (2013.01); *H04L 63/1416* (2013.01); *H04L 63/1441* (2013.01)

(58) Field of Classification Search
CPC   H04L 63/029; H04L 63/1416; H04L 63/1441
See application file for complete search history.

(56) References Cited

U.S. PATENT DOCUMENTS

| | | | | |
|---|---|---|---|---|
| 7,516,487 B1* | 4/2009 | Szeto | .................. | H04L 63/0263 726/13 |
| 10,944,764 B2* | 3/2021 | Mixer | ..................... | H04L 63/20 |

* cited by examiner

*Primary Examiner* — Huan V Doan
(74) *Attorney, Agent, or Firm* — Moore & Van Allen PLLC; Lauren M. Stokes

(57) ABSTRACT

Systems, computer program products, and methods are described herein for implementing real time protocol modifications for address resolutions protocols in a network environment. The present disclosure is configured to identify an address resolution protocol (ARP) cache table comprising an internet protocol (IP) address and a media access control (MAC) address for a communication mapping(s); determine a firewall property(ies) of the ARP cache table for the communication mapping(s); compare the firewall property(ies) to at least one normal firewall property and determine whether the firewall property(ies) is anomalous compared to the normal firewall property(ies); automatically execute a smart contract, wherein the smart contract comprises an authorization protocol(s) for the ARP cache table and an execution of a homomorphic encryption for the ARP cache table; and protect the ARP cache table based on the execution of the smart contract with the authorization protocol(s) and the homomorphic encryption.

20 Claims, 6 Drawing Sheets

SYSTEMS AND METHODS FOR IMPLEMENTING REAL TIME PROTOCOL MODIFICATIONS FOR ADDRESS RESOLUTION PROTOCOLS IN A NETWORK ENVIRONMENT

TECHNOLOGICAL FIELD

Example embodiments of the present disclosure relate to implementing real time protocol modifications for address resolutions protocols in a network environment.

BACKGROUND

Issues often arise in cybersecurity when address resolution protocol (ARP) entries are tampered with during network communications when an internet protocol (IP) address is resolved to an Ethernet address (e.g., a MAC address). In such instances, the ARP entries are vulnerable to ARP cache poisoning and the malicious actors are able to hide behind fake IP addresses, which may be used for man in the middle attacks, data misappropriation (such as by inputting fake IP addresses to reroute data in the ARP cache table), and/or the like. Thus, a system, method, or computer program product is needed to protect these ARP cache tables, their entries, and to prevent future tampering in an automatic, dynamic, secure, and efficient manner.

Applicant has identified a number of deficiencies and problems associated with protecting ARP cache tables and their entries during network communications and protocols. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for implementing real time protocol modifications for address resolutions protocols in a network environment.

In one aspect, a system for implementing real time protocol modifications for address resolution protocols in a network environment is provided. The system may comprise: a processing device; a non-transitory storage device containing instructions when executed by the processing device, causes the processing device to perform the steps of: identify an address resolution protocol (ARP) cache table, wherein the ARP cache table comprises at least one internet protocol (IP) address and at least one media access control (MAC) address for at least one communication mapping; determine at least one firewall property of the ARP cache table for the at least one communication mapping; compare the at least one firewall property to at least one normal firewall property and determine whether the at least one firewall property is anomalous compared to the at least one normal firewall property; automatically, in response to the determination of anomalous at least one firewall property, execute a smart contract, wherein the smart contract comprises at least one authorization protocol for the ARP cache table and an execution of a homomorphic encryption for the ARP cache table; and protect the ARP cache table based on the execution of the smart contract with the at least one authorization protocol and the homomorphic encryption.

In some embodiments, the instructions when executed by the processing device, causes the processing device to perform the steps of: apply a network segmentation protocol based on the at least one firewall property, wherein the network segmentation protocol comprises at least one access control measure for the ARP cache table comprising a plurality of communication mappings. In some embodiments, the network segmentation protocol is based on at least one of a data sensitivity of the at least one communication mapping, a network traffic data flow of the at least one communication mapping, data sender location associated with the at least one communication mapping, or data recipient location associated with of the at least one communication mapping.

In some embodiments, the instructions when executed by the processing device, causes the processing device to perform the steps of: automatically disable static ARP cache table access for the ARP cache table.

In some embodiments, the at least one firewall property comprises network traffic patterns associated with the ARP cache table, a negative list of IP addresses, duplicate IP address and MAC address list, or frequent ARP cache table requests. In some embodiments, the negative list of IP addresses comprises at least one IP address that has previously been determined as malicious.

In some embodiments, the ARP cache table comprising a plurality of communication mappings between a plurality of IP addresses and a plurality of MAC addresses.

Similarly, and as a person of skill in the art will understand, each of the features, functions, and advantages provided herein with respect to the system disclosed hereinabove may additionally be provided with respect to a computer-implemented method and computer program product. Such embodiments are provided for exemplary purposes below and are not intended to be limited.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
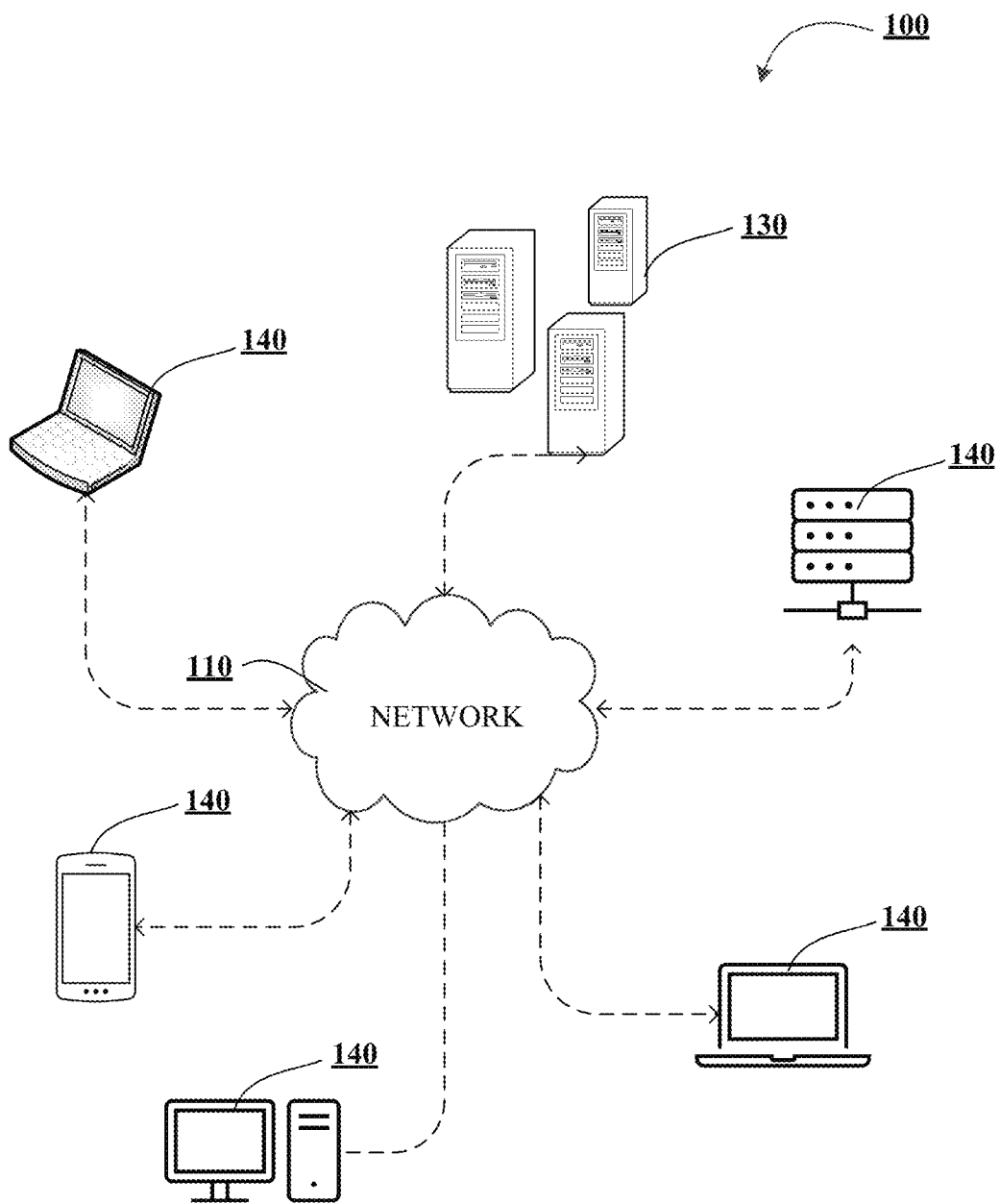
Figure 1B:
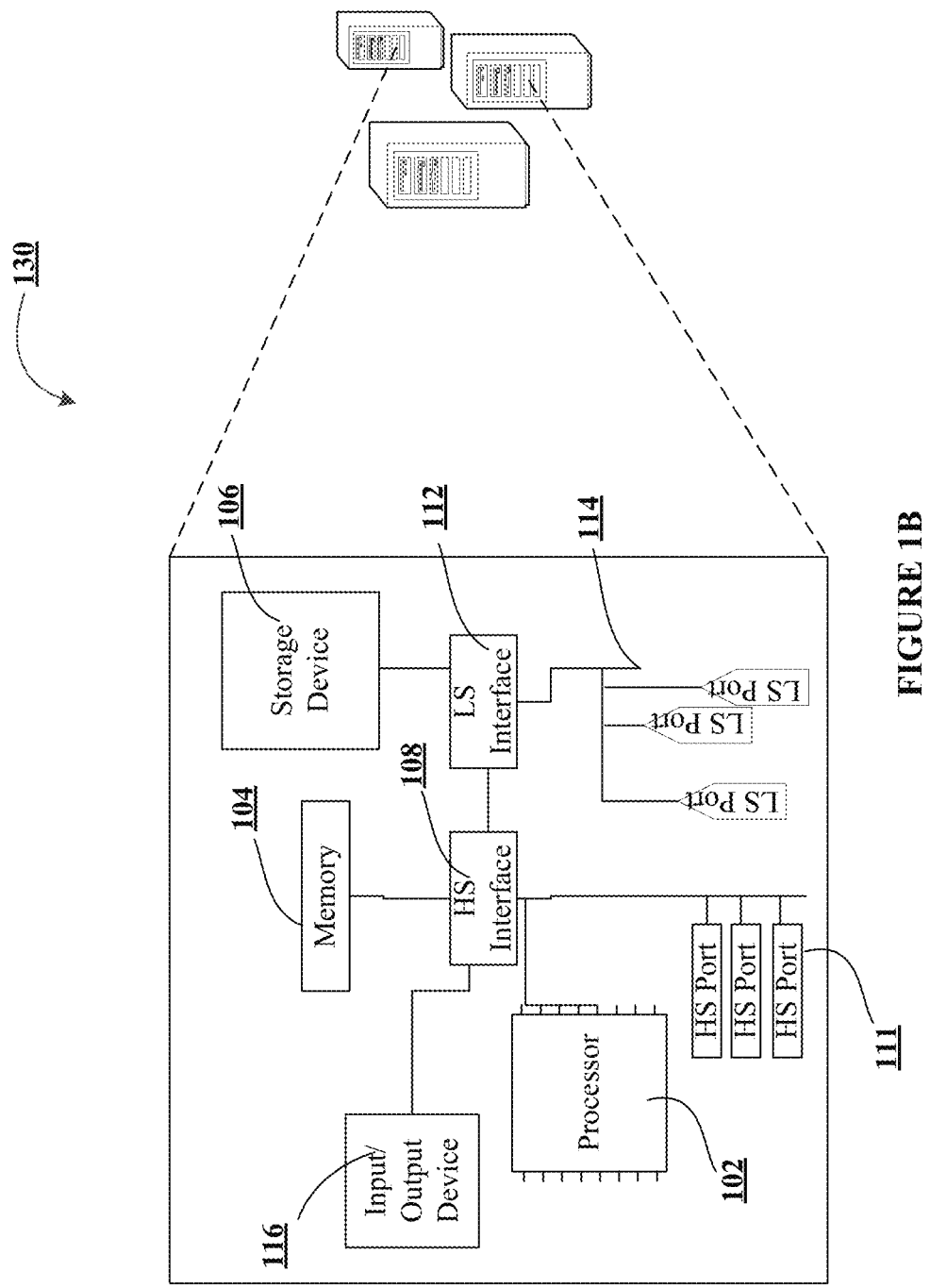
Figure 1C:
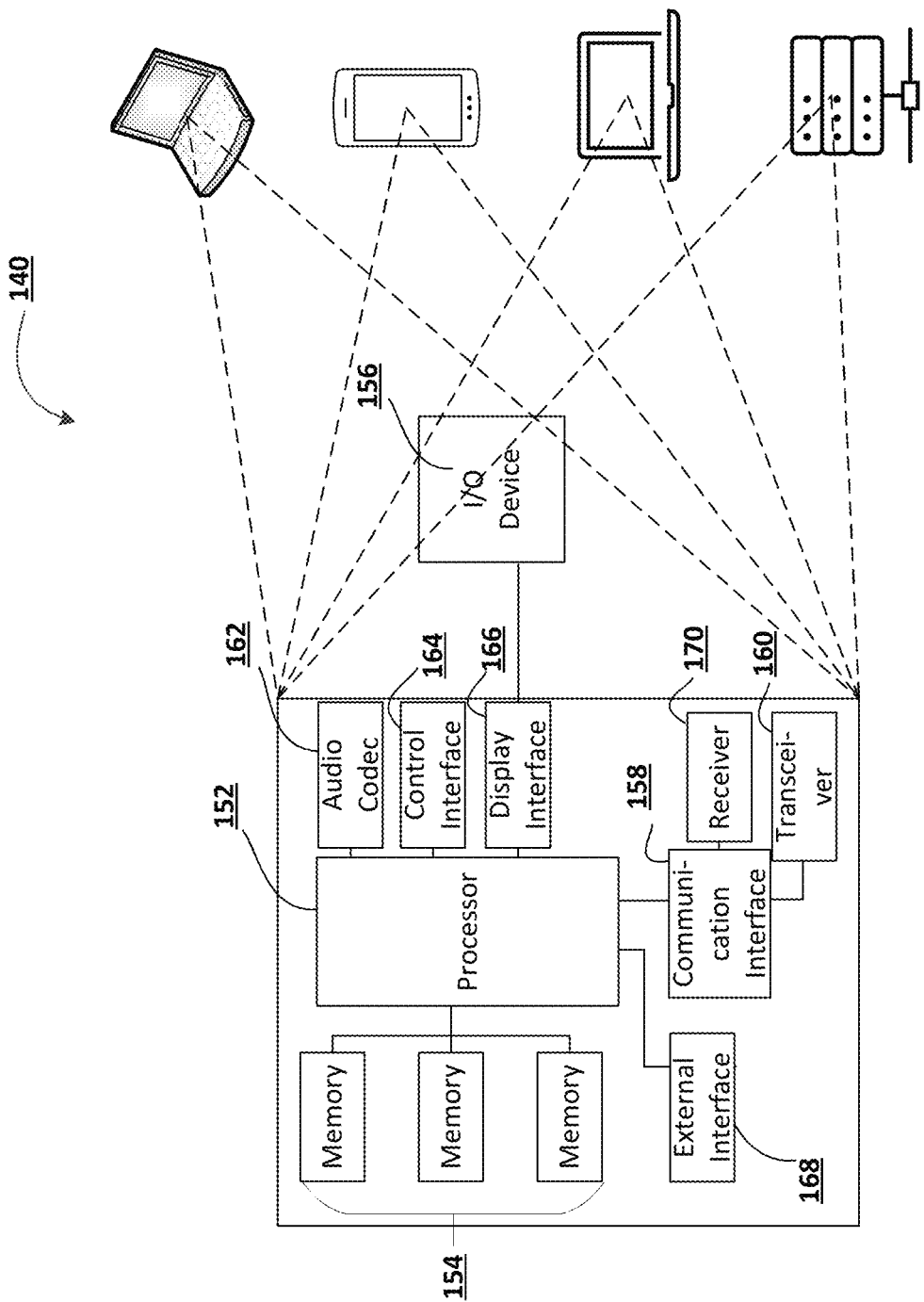
Figure 2:
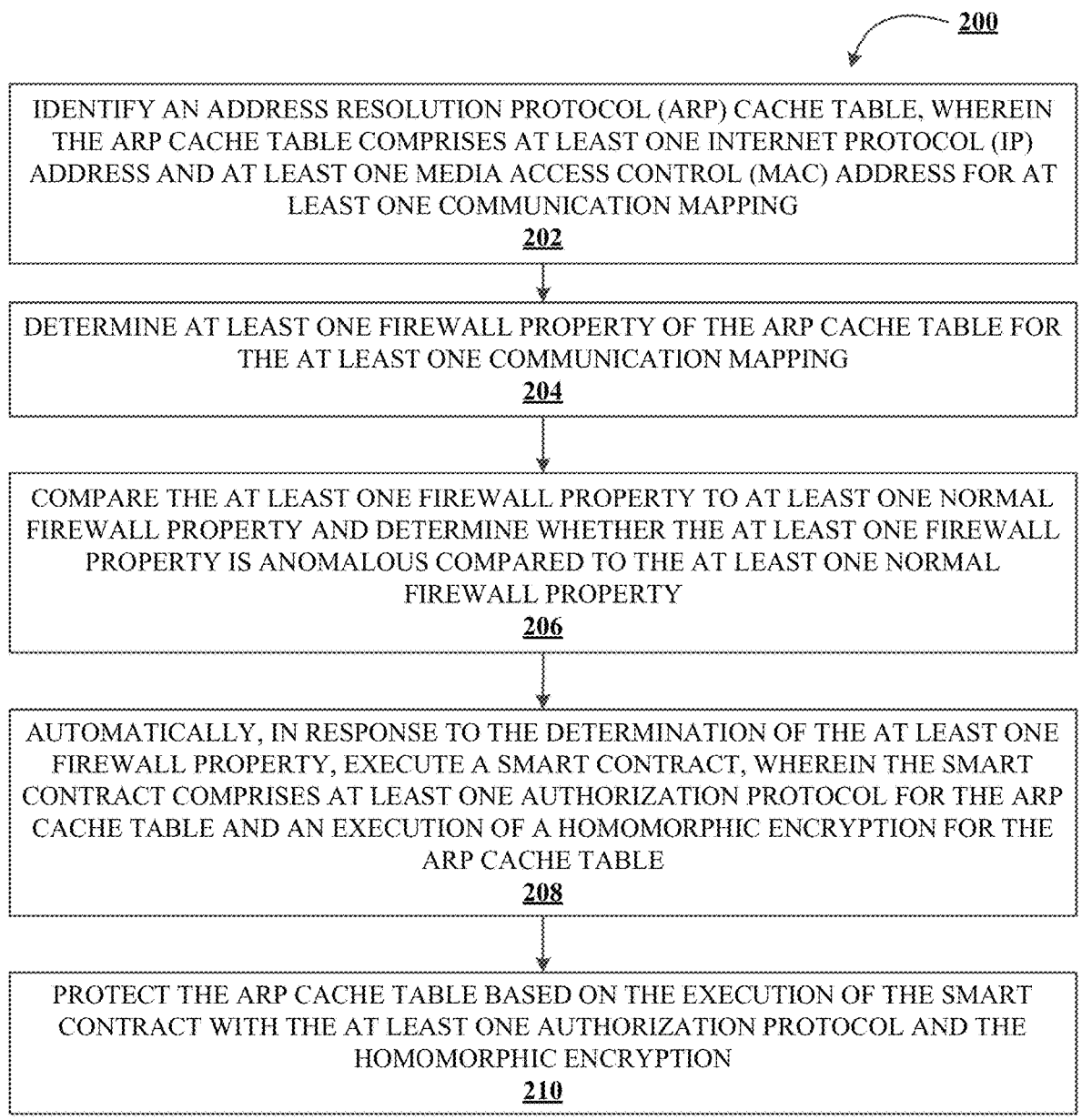
Figure 3:
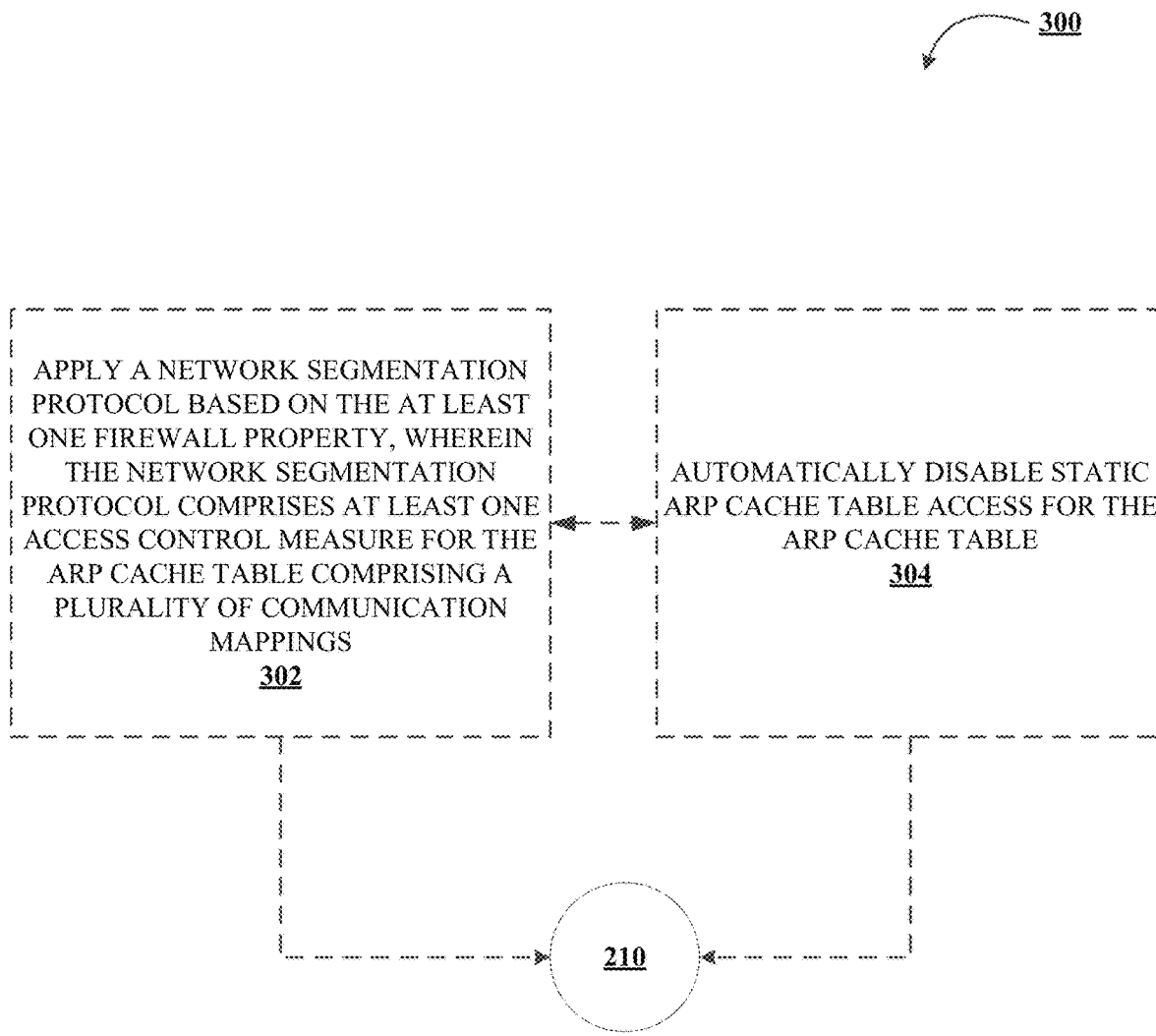
Figure 4:
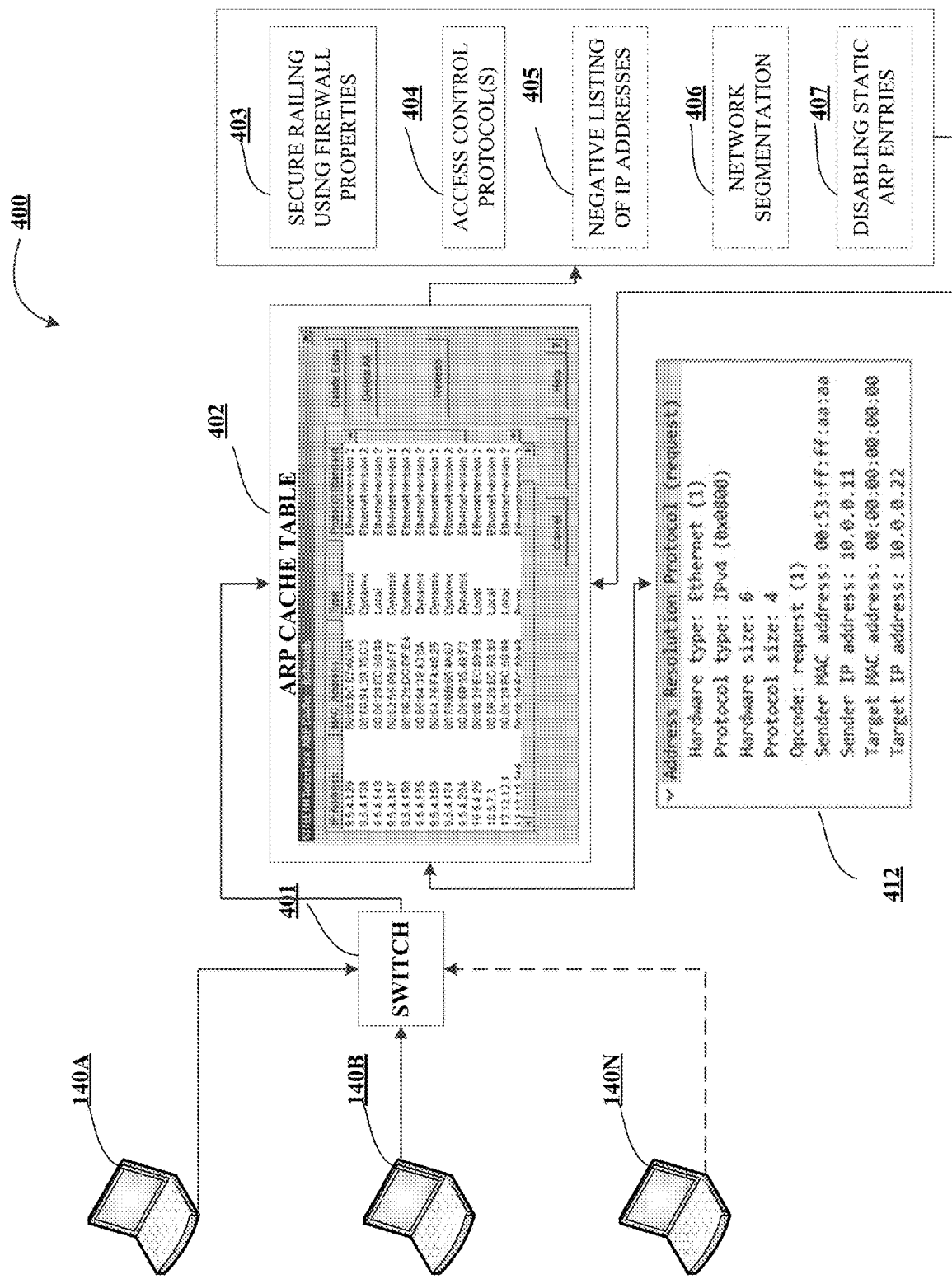

FIGS. 1A-1C illustrates technical components of an exemplary distributed computing environment for implementing real time protocol modifications for address resolutions protocols in a network environment, in accordance with an embodiment of the disclosure;

FIG. 2 illustrates a process flow for implementing real time protocol modifications for address resolutions protocols in a network environment, in accordance with an embodiment of the disclosure;

FIG. 3 illustrates a process flow for protecting the ARP cache table by applying a network segmentation protocol and/or disabling static ARP cache table access, in accordance with an embodiment of the disclosure; and FIG. 4 illustrates exemplary technical components for implementing real time protocol modifications for address resolutions protocols in a network environment, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Issues often arise in cybersecurity when address resolution protocol (ARP) entries are tampered with during network communications when an internet protocol (IP) address is resolved to an Ethernet address (e.g., a MAC address). In such instances, the ARP entries are vulnerable to ARP cache poisoning and the malicious actors are able to hide behind fake IP addresses, which may be used for man in the middle attacks, data misappropriation (such as by inputting fake IP addresses to reroute data in the ARP cache table), and/or the like. Thus, a system, method, or computer program product is needed to protect these ARP cache tables, their entries, and to prevent future tampering in an automatic, dynamic, secure, and efficient manner.

Accordingly, the present disclosure provides for identifying an address resolution protocol (ARP) cache table, wherein the ARP cache table comprises at least one internet protocol (IP) address and at least one media access control (MAC) address for at least one communication mapping; determining at least one firewall property of the ARP cache table for the at least one communication mapping; and comparing the at least one firewall property to at least one normal firewall property and determine whether the at least one firewall property is anomalous compared to the at least one normal firewall property. Additionally, the disclosure further provides for automatically, in response to the determination of anomalous at least one firewall property, executing a smart contract, wherein the smart contract comprises at least one authorization protocol for the ARP cache table and an execution of a homomorphic encryption for the ARP cache table; and protecting the ARP cache table based on the execution of the smart contract with the at least one authorization protocol and the homomorphic encryption.

In other words, the disclosure provides a system that protects ARP cache data which is open to attacks, spoofing, and/or the like, whenever a connection in an open network is made between servers (such as between two different MAC and IP addresses that request some sort of data transmission). Within this ARP cache table, IP addresses and MAC addresses are collected and linked together, and a bad actor may intercept the transmission and input their IP and/or MAC address to receive the original data transmission. Thus, the system described herein protects the ARP cache from these bad actors by integrating a smart contract which is linked to a secure railing using firewall properties, whereby the smart contract may comprise data regarding firewall properties which are standard and which may indicate a red flag to the system (e.g., when a negative IP listing is used by previously-identified bad users, when data is particularly sensitive that is being transmitted, and/or the like) and whereby the smart contract is used to automatically determine whether the ARP cache data for the data transmission should be restricted by specific access controls and users, encrypting the ARP cache data, disabling static ARP cache data, and/or the like. Additionally, the system may use network segmentation of the ARP cache table based on the data sensitivity, traffic flow, and/or the like, such that there may be less downtime or interruptions to the processes described herein. The system may further implement homomorphic encryption to encrypt the ARP cache table, which allows for a user to view the cache data in ciphertext, while also protecting the data in its original form. The system additionally acts by disabling the static ARP data (e.g., the data which may be manually input within the ARP cache table) in order to ensure the data in the ARP table is not spoofed via man in the middle attacks and/or the like.

What is more, the present disclosure provides a technical solution to a technical problem. As described herein, the technical problem includes protecting ARP cache tables and their entries during network communications and protocols protecting ARP cache tables and their entries during network communications and protocols. The technical solution presented herein allows for protecting ARP cache tables, their entries, and to prevent future tampering in an automatic, dynamic, secure, and efficient manner. In particular, the disclosure provided herein is an improvement over existing solutions to the protecting ARP cache tables (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for implementing real time protocol modifications for address resolutions protocols in a network environment 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions.

The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for implementing real time protocol modifications for address resolutions protocols in a network environment, in accordance with an embodiment of the disclosure. In some embodiments, a system (e.g., similar to one or more of the systems described herein with respect to FIGS. 1A-1C) may perform one or more of the steps of process flow 200. For example, a system (e.g., the system 130 described herein with respect to FIG. 1A-1C) may perform the steps of process 200.

As shown in block 202, the process flow 200 may include the step of identifying an address resolution protocol (ARP) cache table, wherein the ARP cache table comprises at least one internet protocol (IP) address and at least one media access control (MAC) address for at least one communication mapping. For example, the system may identify an ARP cache table based on identifying an ARP cache table in a random access memory (RAM) storage device associated with the system (e.g., stored with the system, accessed by the system but stored remotely, and/or the like). In some such embodiments, the ARP cache table may be dynamically and automatically updated to track and record every communication mapping when an IP address is resolved to a MAC address or Ethernet address (e.g., such that the computer can communicate with the IP address). In such embodiments, the ARP cache table may comprise a sender IP address and sender MAC address and a recipient (or target) IP address and recipient MAC address which makes up the communication mapping for each network communication between user devices.

In some embodiments, the ARP cache table may comprise data regarding the hardware type (e.g., whether or not the hardware is an Ethernet type), the protocol type, the Hardware size, the Protocol size, sender MAC address, sender IP address, target or recipient MAC address, and/or target or recipient IP address. Additionally, and for each entry within the ARP cache table (e.g., each entry or record of each communication mapping), each entry may be categorized as dynamic or static. For example, a static entry which is a manual or intervened entry which is manually created, changed, updated, or tampered with (such as by a bad or malicious actor). In contrast, a dynamic entry is automatically generated within the ARP cache.

As used herein, the ARP cache table may comprise a plurality of communication mappings (or a plurality of entries) between a plurality of IP addresses and a plurality of MAC addresses. For example, and as shown in FIG. 4 (showing an exemplary ARP cache table), a plurality of entries indicating the IP address, the MAC address, and whether the entry is static or dynamic may be shown in the ARP cache table. In other words, the communication mapping is the communications (or intended data transmissions) between the sender device and the recipient or target device (including the sender MAC address and sender IP address, and the recipient MAC address and recipient IP address).

As shown in block 204, the process flow 200 may include the step of determining at least one firewall property of the ARP cache table for the at least one communication mapping. For example, the system may determine at least one firewall property of the ARP cache table, such that the firewall property(ies) of the ARP cache table currently are compared to or measured against a normalized or expected firewall property(ies). In this manner, and when a current firewall property(ies) is unexpected or different than what is expected or normal, then the system may determine—automatically—that malicious activity is likely present (e.g., greater static entries are present in the ARP cache table, which may indicate that more bad actors are attempting to manually change the recipient IP address and recipient MAC address, and/or change the sender IP address and sender MAC address, and/or the like. For example, and by manually changing the recipient IP address and recipient MAC address, a bad actor may intercept the data transmission between the original sender device and original recipient device.

In some embodiments, the firewall property(ies) at issue within this step of process flow 200 may comprise (but is not limited to) network traffic patterns associated with the ARP cache table (e.g., whether the network traffic patterns are normal or an expected amount); a negative list of IP addresses (e.g., whether any of the IP addresses in the ARP cache table have previously been identified as associated with a bad actor); duplicate IP address and MAC address list (e.g., indicating a cloning of IP addresses and MAC addresses which may have been done by a bad actor attempting to spoof the communication mapping); and/or frequent ARP cache table requests (e.g., from and/or to the same IP address and/or MAC address more than an expected or normal amount of requests). In some embodiments, and as described briefly above, the negative list of IP addresses may comprise at least one IP address that has previously been determined as malicious or previously determined as used by a bad actor for spoofing, hacking, interfering, misappropriating, and/or the like.

As shown in block 206, the process flow 200 may include the step of comparing the at least one firewall property to at least one normal firewall property and determining whether the at least one firewall property is anomalous compared to the at least one normal firewall property. For instance, the system may compare (i.e., determine the similarities or differences between the normal firewall property(ies) and the current firewall property(ies), which may be quantified based on the differences same kind of each of the one or more properties) to determine whether the current firewall property(ies) is the same or in contrast, anomalous (different) than the normal or expected firewall property. For instance, and where the current firewall property is the network traffic pattern is much greater than the normal firewall property of network traffic patterns for the ARP cache table, then the system may flag the firewall property as being anomalous. In some such embodiments, a threshold range around the normal network traffic pattern (e.g., well below the normal lowest network traffic pattern and/or well above the highest normal network traffic pattern) may be used to determine anomalous network traffic patterns. Additionally, and by way of example, where the current firewall property comprises a high number of frequent ARP cache table requests from the same MAC and IP addresses, which is greater than the normal number of frequent ARP cache table requests that is expected, then the system may flag this current firewall property as anomalous. In such embodiments, the normal firewall property relied on for comparison may be based on past or historical firewall properties which were determined to not comprise malicious activity or malicious interceptions (e.g., non-malicious static entries, and/or the like). In some embodiments, such a flagging by the system of the anomalous firewall property(ies) may be used by the system to automatically trigger execution of the smart contract described below.

In some embodiments, the system may use a plurality of current firewall properties and compare the same types of normal firewall properties to the current firewall properties to determine whether the current firewall properties are anomalous. In some such embodiments, each current firewall property and its determine of anomalous behavior may be weighted the same as compared to the other current firewall properties. In some other embodiments, each firewall property may be weighted differently based on past or historical determinations of malicious activity (e.g., negative IP listings were identified for particular bad actors, this firewall property may be weighted the highest by the system). In some embodiments, the system itself may generate these weightages for each firewall property, such as based on feedback loop from its determinations of malicious activities and a feedback loop indicating whether the malicious activity was true or false.

In some embodiments, a weightage of the current firewall properties determined as anomalous are combined to create an overall anomalous weightage, and such an anomalous weightage is used and compared against an anomalous weightage threshold. In some such embodiments, and in an instance where the anomalous weightage meets and/or exceeds the anomalous weightage threshold, the system may automatically execute a smart contract (like the smart contract described hereinbelow). In some embodiments, and where only one current firewall property is determined as anomalous, the system may automatically execute the smart contract described hereinbelow.

As shown in block 208, the process flow 200 may include the step of automatically, in response to the determination of the at least one firewall property, executing a smart contract, wherein the smart contract comprises at least one authorization protocol for the ARP cache table and an execution of a homomorphic encryption for the ARP cache table. For instance, the system may automatically execute a smart contract when a current firewall property is determined as anomalous (or a plurality of firewall properties are determined anomalous), and the smart contract may automatically trigger at least one of a protective measure for the ARP cache table such as but not limited to encrypting the ARP cache table with a homomorphic encryption and/or applying at least one authorization protocol to the ARP cache table.

As used herein, the authorization protocol comprises access controls for accessing and/or modifying the ARP cache table. In some embodiments, the access controls may comprise identifiers regarding what user accounts, device identifiers, IP addresses and/or MAC addresses and/or the like, which may tamper with or change the addresses within the communication mapping (such as by static entries). In this manner, the system may limit the users that may access and/or modify the ARP cache table to only particular users and/or particular devices. In some embodiments, these access controls may be based on the entire ARP cache table and/or may be based on individual entries of the ARP cache table (e.g., only certain users may access and/or modify the ARP cache entries associated with certain IP or MAC addresses).

Additionally, and/or alternatively, the system may also protect the ARP cache table by applying homomorphic encryption the ARP cache table. For example, such a homomorphic encryption will allow operations to be performed without compromising the encryption (such as operations/computations regarding the communication mappings without having to decrypt the ARP cache table first). In this manner, the ARP cache table remains secure and confidential, while also allowing for the detection and filtering out of any ARP entries which are invalid or do not contain the right encrypted data or information.

In some embodiments, the smart contract described herein may additionally comprise elevated authorization protocol access, whereby if there is determined malicious activity within the network of the ARP cache table, then the system may secure communication protocols through authentication and authorization over the communication channel(s). In this manner, the smart contract(s) may be used to limit the potential communication mappings which may occur within a network, before the communication mappings are recorded and executed within the ARP cache table. Thus, and in order to prevent further malicious activity within a network after a bad actor has already accessed the network, communications within the network may be limited to only certain authorization protocols that were pre-identified as allowed to prevent further malicious activity.

As shown in block 210, the process flow 200 may include the step of protecting the ARP cache table based on the execution of the smart contract with the at least one authorization protocol and the homomorphic encryption. For instance, the system may protect the ARP cache table by automatically executing the smart contract with at least the authorized protocol(s) and the homomorphic encryption. In some embodiments, the smart contract may further comprise the automatic execution of a network segmentation protocol (described in further detail below with respect to FIG. 3) and/or disabling static ARP cache table access (also described in further detail below with respect to FIG. 3).

In this manner, the automatic execution of the smart contract with these protection protocols allows automatic protection of the ARP cache table from tampering, man in the middle attacks, poison attacks, and/or the like, while still allowing for manual intervention by allowed users with the access controls and the homomorphic encryption.

FIG. 3 illustrates a process flow 300 for protecting the ARP cache table by applying a network segmentation protocol and/or disabling static ARP cache table access, in accordance with an embodiment of the disclosure. In some embodiments, a system (e.g., similar to one or more of the systems described herein with respect to FIGS. 1A-1C) may perform one or more of the steps of process flow 300. For example, a system (e.g., the system 130 described herein with respect to FIG. 1A-1C) may perform the steps of process 300.

In some embodiments, and as shown in block 302, the process flow 300 may include the step of applying a network segmentation protocol based on the at least one firewall property, wherein the network segmentation protocol comprises at least one access control measure for the ARP cache table comprising a plurality of communication mappings. For example, and in some embodiments, the system may additionally and/or alternatively protect the ARP cache table by applying a network segmentation to the ARP cache table, whereby the network segmentation divides the network into smaller, distinct sub-networks which allows for unique security measures for each sub-network. In some such embodiments, the network segmentation allows for the control and minimization of impacts to spoofing or malicious attacks within the ARP cache tables.

In some embodiments, the network segmentation protocol may be based on at least one of a data sensitivity of the at least one communication mapping, a network traffic data flow of the at least one communication mapping, data sender location associated with the at least one communication mapping, and/or data recipient location associated with of the at least one communication mapping. For example, and in some embodiments, such a network segmentation may be based on the sensitivity of the data involved within the communication mapping(s), whereby the more sensitive the data transmitted, the greater the impact may be if the ARP cache table comprising the sensitive data is not segmented to compartmentalize the ARP cache table entry (ies) with the sensitive data. In some embodiments, the network segmentation may be based on the number of entries within the ARP cache table, whereby the network segmentation may be based on a threshold number of entries that the original ARP cache table must meet before the ARP cache table is segmented in the network segmentation. In some embodiments, the network segmentation may be based on where the communication mapping has for the recipient of the data transmission, where the data transmission is being transmitted from (e.g., the sender IP address/MAC address), and/or the like. In some such embodiments, the network segmentation may segment the entries with the same targets or recipients IP addresses/MAC addresses and/or segment the entries with the same sender IP addresses/MAC addresses. In some embodiments, and where access has been limited to access and/or modify the ARP cache table, the network segmentation may be based on who has access to modify the ARP cache table, such that only those entries with the same access control protocols are segmented together. Additionally, and/or alternatively, the network segmentation may be based on network traffic data flow of the at least one communication mapping, whereby if the system determines that a lot of network traffic flow is occurring (e.g., greater than the normal amount of network traffic flow), then the system may segment the network to better assess and analyze the communication mappings within the ARP cache table (such that only a few communication mapping entries are comprised within each network segmentation) and it is easier for the system to determine which ARP cache entries are false or are associated with malicious activity without overburdening the overall network.

In some embodiments, and as shown in block 304, the process flow 300 may include the step of automatically disabling static ARP cache table access for the ARP cache table. For example, and in some embodiments, the system may automatically disable static entries from being input to the ARP cache table and instead may only allow the dynamic ARP entries to continue being written to the ARP cache table. By disabling the static entries to the ARP cache table, the system will limit the access for manual intervention or manual modifications to the communication mappings within the ARP cache table, thus improving data security and efficiency in analyzing each ARP cache entry for potential malicious activity. In this manner, bad actors will no longer be able to manually input a MAC address and/or an IP address that can intervene in the intended data transmission. However, and in some embodiments, the disabling of the static entries (i.e., disabling static ARP cache table access) may still allow static entries from pre-identified user accounts based on the access controls in the authorization protocol(s) (like those described above with respect to FIG. 3).

In some embodiments, and as shown in process flow 300, the processes and steps described herein with respect to blocks 302 and 304 may occur before the processes shown and described with respect to block 210, such that the processes of 302 and/or 304 may be used to additionally and/or alternatively protect the ARP cache table. Such an embodiment is shown and further described below with respect to FIG. 4.

FIG. 4 illustrates exemplary technical components 400 for implementing real time protocol modifications for address resolutions protocols in a network environment, in accordance with an embodiment of the disclosure. In some embodiments, a system (e.g., similar to one or more of the systems described herein with respect to FIGS. 1A-1C) may perform one or more of the steps of exemplary technical components 400. For example, a system (e.g., the system 130 described herein with respect to FIG. 1A-1C) may perform the steps of exemplary technical components 400.

As shown in the diagram of technical components 400, the system described herein may comprise a plurality of user devices (e.g., user device 140A, 140B, . . . 140N) each with their own associated IP addresses and MAC addresses (such as the MAC address associated with the user device's network). In some embodiments, and as shown in exemplary technical component diagram 400, the user devices may communicate with each other and transmit data (e.g., data may be transmitted between user device 140A and 140B), but in order to carry out the data transmission, the communication mapping of each data transmission must be recorded in an ARP cache table 402. Each ARP cache table request (e.g., such as that shown in ARP request 412) may comprise data regarding the sender IP address, the sender MAC address, the recipient or target IP address, and the target MAC address). In certain instances, a malicious actor may access this ARP cache table 402 and manually input their IP address and/or MAC address to circumvent the intended data transmission (e.g., by inputting their IP address and MAC address as the target IP address and target MAC address) by inputting the IP address and MAC address as a static entry.

However, and in order to prevent such malicious activities, the disclosure provided herein allows for the use of secure railing using firewall properties (i.e., using a smart contract for automatic execution of protective protocols based on firewall property(ies) including encrypting the ARP cache table with homomorphic encryption) 403, applying access control protocol(s) on the ARP cache table 404, recording a negative listing of IP addresses for previous or historical malicious actors and attempts 405, network segmentation 406, and/or disabling static ARP entries 407.

As understood by a person of skill in the art, each of these protection protocols may be automatically executed based on a smart contract execution and/or may be manually executed as necessary for protection of the ARP cache table. In some embodiments, each of these protection protocols (403, 404, 405, 407, and 407) may be carried out individually, as a combination of only some of the protection protocols, and/or a full combination of all the protection protocols.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for implementing real time protocol modifications for address resolution protocols in a network environment, the system comprising:
   a processing device;
   a non-transitory storage device containing instructions when executed by the processing device, causes the processing device to perform the steps of:

identify an address resolution protocol (ARP) cache table, wherein the ARP cache table comprises at least one internet protocol (IP) address and at least one media access control (MAC) address for at least one communication mapping;

determine at least one firewall property of the ARP cache table for the at least one communication mapping;

compare the at least one firewall property to at least one normal firewall property and determine whether the at least one firewall property is anomalous compared to the at least one normal firewall property;

automatically, in response to the determination of anomalous at least one firewall property, execute a smart contract, wherein the smart contract comprises at least one authorization protocol for the ARP cache table and an execution of a homomorphic encryption for the ARP cache table; and protect the ARP cache table based on the execution of the smart contract with the at least one authorization protocol and the homomorphic encryption.

2. The system of claim 1, wherein the instructions when executed by the processing device, causes the processing device to perform the steps of:

apply a network segmentation protocol based on the at least one firewall property, wherein the network segmentation protocol comprises at least one access control measure for the ARP cache table comprising a plurality of communication mappings.

3. The system of claim 2, wherein the network segmentation protocol is based on at least one of a data sensitivity of the at least one communication mapping, a network traffic data flow of the at least one communication mapping, data sender location associated with the at least one communication mapping, or data recipient location associated with of the at least one communication mapping.

4. The system of claim 1, wherein the instructions when executed by the processing device, causes the processing device to perform the steps of:

automatically disable static ARP cache table access for the ARP cache table.

5. The system of claim 1, wherein the at least one firewall property comprises network traffic patterns associated with the ARP cache table, a negative list of IP addresses, duplicate IP address and MAC address list, or frequent ARP cache table requests.

6. The system of claim 5, wherein the negative list of IP addresses comprises at least one IP address that has previously been determined as malicious.

7. The system of claim 1, wherein the ARP cache table comprises a plurality of communication mappings between a plurality of IP addresses and a plurality of MAC addresses.

8. A computer program product for implementing real time protocol modifications for address resolution protocols in a network environment, the computer program product comprising a non-transitory computer-readable medium comprising code causing an apparatus to:

identify an address resolution protocol (ARP) cache table, wherein the ARP cache table comprises at least one internet protocol (IP) address and at least one media access control (MAC) address for at least one communication mapping;

determine at least one firewall property of the ARP cache table for the at least one communication mapping;

compare the at least one firewall property to at least one normal firewall property and determine whether the at least one firewall property is anomalous compared to the at least one normal firewall property;

automatically, in response to the determination of anomalous at least one firewall property, execute a smart contract, wherein the smart contract comprises at least one authorization protocol for the ARP cache table and an execution of a homomorphic encryption for the ARP cache table; and protect the ARP cache table based on the execution of the smart contract with the at least one authorization protocol and the homomorphic encryption.

9. The computer program product of claim 8, the computer program product further comprising non-transitory computer-readable medium comprising code causing an apparatus to:

apply a network segmentation protocol based on the at least one firewall property, wherein the network segmentation protocol comprises at least one access control measure for the ARP cache table comprising a plurality of communication mappings.

10. The computer program product of claim 9, wherein the network segmentation protocol is based on at least one of a data sensitivity of the at least one communication mapping, a network traffic data flow of the at least one communication mapping, data sender location associated with the at least one communication mapping, or data recipient location associated with of the at least one communication mapping.

11. The computer program product of claim 8, the computer program product further comprising non-transitory computer-readable medium comprising code causing an apparatus to:

automatically disable static ARP cache table access for the ARP cache table.

12. The computer program product of claim 8, wherein the at least one firewall property comprises network traffic patterns associated with the ARP cache table, a negative list of IP addresses, duplicate IP address and MAC address list, or frequent ARP cache table requests.

13. The computer program product of claim 12, wherein the negative list of IP addresses comprises at least one IP address that has previously been determined as malicious.

14. The computer program product of claim 8, wherein the ARP cache table comprising a plurality of communication mappings between a plurality of IP addresses and a plurality of MAC addresses.

15. A computer implemented method for implementing real time protocol modifications for address resolution protocols in a network environment, the computer implemented method comprising:

identifying an address resolution protocol (ARP) cache table, wherein the ARP cache table comprises at least one internet protocol (IP) address and at least one media access control (MAC) address for at least one communication mapping;

determining at least one firewall property of the ARP cache table for the at least one communication mapping;

comparing the at least one firewall property to at least one normal firewall property and determine whether the at least one firewall property is anomalous compared to the at least one normal firewall property;

automatically, in response to the determination of anomalous at least one firewall property, executing a smart contract, wherein the smart contract comprises at least one authorization protocol for the ARP cache table and an execution of a homomorphic encryption for the ARP cache table; and protecting the ARP cache table based on the execution of the smart contract with the at least one authorization protocol and the homomorphic encryption.

16. The computer implemented method of claim 15, further comprising: applying a network segmentation protocol based on the at least one firewall property, wherein the network segmentation protocol comprises at least one access control measure for the ARP cache table comprising a plurality of communication mappings.

17. The computer implemented method of claim 16, wherein the network segmentation protocol is based on at least one of a data sensitivity of the at least one communication mapping, a network traffic data flow of the at least one communication mapping, data sender location associated with the at least one communication mapping, or data recipient location associated with of the at least one communication mapping.

18. The computer implemented method of claim 15, further comprising: automatically disabling static ARP cache table access for the ARP cache table.

19. The computer implemented method of claim 15, wherein the at least one firewall property comprises network traffic patterns associated with the ARP cache table, a negative list of IP addresses, duplicate IP address and MAC address list, or frequent ARP cache table requests.

20. The computer implemented method of claim 19, wherein the negative list of IP addresses comprises at least one IP address that has previously been determined as malicious.

* * * * *